(12) United States Patent
Seo et al.

(10) Patent No.: US 6,582,081 B2
(45) Date of Patent: Jun. 24, 2003

(54) PROJECTION DISPLAY DEVICE

(75) Inventors: Eun-Seong Seo, Seoul (KR); Joon-Chan Park, Dongan-gu (KR)

(73) Assignee: Samsung SDI Co., Ltd., Suwon (KR)

( * ) Notice: Subject to any disclaimer, the term of this patent is extended or adjusted under 35 U.S.C. 154(b) by 0 days.

(21) Appl. No.: 10/114,324

(22) Filed: Apr. 3, 2002

(65) Prior Publication Data

US 2002/0154273 A1 Oct. 24, 2002

(30) Foreign Application Priority Data

Apr. 24, 2001 (KR) ........................................ 2001-22100

(51) Int. Cl.[7] ............................................... G03B 21/14
(52) U.S. Cl. ........................................... 353/20; 353/31
(58) Field of Search ............................. 353/20, 33, 31, 353/81; 359/483

(56) References Cited

U.S. PATENT DOCUMENTS

| | | | | |
|---|---|---|---|---|
| 5,042,921 A | * | 8/1991 | Sato et al. ...................... | 349/9 |
| 5,381,278 A | * | 1/1995 | Shingaki et al. ................ | 349/9 |
| 5,387,991 A | * | 2/1995 | Mitsutake et al. .............. | 349/1 |
| 5,446,510 A | | 8/1995 | Mitsutake et al. | |
| 5,452,128 A | * | 9/1995 | Kimura .......................... | 349/9 |
| 5,461,500 A | * | 10/1995 | Tsuji et al. ..................... | 349/9 |
| 6,067,193 A | * | 5/2000 | Sekine et al. .................. | 349/5 |
| 6,304,302 B1 | * | 10/2001 | Huang et al. ................... | 349/9 |

* cited by examiner

*Primary Examiner*—Russell Adams
*Assistant Examiner*—Michelle Nguyen
(74) *Attorney, Agent, or Firm*—Robert E. Bushnell, Esq.

(57) ABSTRACT

The present invention discloses a projection display device, including a light source supplying light having a s-wave light and a p-wave light; a first polarizing beam splitter including a reflecting surface, transmitting the p-wave light and reflecting the s-wave light; a retardation film arranged between the light source and the polarizing beam splitter to cover a portion of a front surface of the polarizing beam splitter, and converting the s-wave light into the p-wave light and the p-wave light into the s-wave light; a mirror re-reflecting the s-wave light reflected from the reflecting surface of the first polarizing beam splitter toward the reflecting surface of the first polarizing beam splitter, so that the s-wave light directs toward the retardation film.

20 Claims, 6 Drawing Sheets

PROJECTION DISPLAY DEVICE

CLAIM OF PRIORITY

This application makes reference to, incorporates the same herein, and claims all benefits accruing under 35 U.S.C. §119 from an application for *Light Converting Apparatus of Projection System* earlier filed in the Korean Industrial Property Office on Apr. 24, 2001 and there duly assigned Serial No. 2001-22100.

BACKGROUND OF THE INVENTION

1. Field of the Invention

The present invention relates to a projection display device, and more particularly, to a projection display device having a high optical efficiency.

2. Description of Related Art

A liquid crystal (LC) projector includes an LC panel as a modulator for modulating light from a light source to form an image. The LC panel is divided into two types including a transmissive type and a reflective type. A poly-silicon liquid crystal display is mainly used as the transmissive LC panel, and a digital micromirror device (DMD) and a liquid crystal on silicon (LCOS) device are mainly used as the reflective LC panel.

Of these, the LCOS display recently receives an attention due to a small size and a high resolution. In the LCOS display, a three-panel LC projector or a single-panel LC projector has been used to achieve a full color.

A conventional LCOS projection display device includes a light source, a fly-eyes lens, a polarization converting unit, a condensing lens, a color separating unit, a polarizing beam splitter, a reflective liquid crystal panel, and a projecting unit.

The fly-eyes lens makes light emitted from the light source uniform. The polarization converting unit converts the uniformized light into a p-wave polarized light. The condensing lens condenses the p-wave polarized light. The color separating unit separates red (R), green (G) and blue (B) light rays from the p-wave polarized light. The liquid crystal panel generates s-wave polarized lights and p-wave polarized lights by a switching operation according to the image signals. The polarizing beam splitter reflects the s-wave polarized lights and transmits the p-wave polarized lights. The projecting unit enlarges and projects the s-wave polarized lights to form a color image on a screen.

The polarization converting unit includes a plurality of prisms which allow a p-wave light to be transmitted and reflect a s-wave light. Light shielding films are disposed on the front surfaces of the prisms at prism-height intervals, and retardation films (i.e., half-wavelength plate) are disposed on the rear surface of the prisms opposite to the light shielding films to convert the s-wave light into the p-wave light. Here, an unpolarized light is converted into a polarized light while passing through the prism.

The projection display device having such a configuration achieves a sufficient amount of light. However, in order to make the light enter, only a half of the polarization converting unit, a refraction of the fly-eyes lens and a distance between two fly-eyes lenses must be adjusted. This results in increasing an angle distribution of light by twice due to Lagrange invariant. In this case, there occurs a problem in that a large size of optical components is required, and a contrast ratio is lowered.

In addition, in case of reducing an angle distribution of light, a brightness of the projection display device deteriorates significantly.

In the efforts to overcome the problem described above, a polarizing beam splitter is employed.

U.S. Pat. No. 5,446,510 issued to Mitsutake et al. for *Image Display Apparatus*, discloses an image display apparatus having a polarizing beam splitter. A ¼-wavelength plate and a mirror are disposed over the polarizing beam splitter, and a total reflection prism is employed on an optical axis therein. However, in the image display apparatus having such a configuration, light converted into a p-wave light is irradiated while forming two peaks, thereby deteriorating a uniformity of irradiated light.

SUMMARY OF THE INVENTION

It is therefore an object of the present invention to provide a projection display device having excellent optical efficiency.

It is another object of the present invention to provide a projection display device having a high brightness.

It is still another object of the present invention to provide a projection display device having a high light uniformity.

In order to achieve the above and other objects, the preferred embodiments of the present invention provides a projection display device including a light source supplying light having an s-wave light and a p-wave light; a first polarizing beam splitter including a reflecting surface, transmitting the p-wave light and reflecting the s-wave light; a retardation film arranged between the light source and the polarizing beam splitter to cover a portion of a front surface of the polarizing beam splitter, and converting the s-wave light into the p-wave light and the p-wave light into the s-wave light; a mirror re-reflecting the s-wave light reflected from the reflecting surface of the first polarizing beam splitter toward the reflecting surface of the first polarizing beam splitter, so that the s-wave light directs toward the retardation film.

The projection display device further includes a fly-eyes lens making the p-wave light passing through the first beam splitter uniform; a condensing lens condenses the light passing through the fly-eyes lens; a color separating unit separating R, G and B lights from the light passing through the condensing lens; a modulating unit modulating the R, G and B lights incident thereto to output a p-wave light and a s-wave light; a second polarizing beam splitter transmitting the p-wave light and reflecting the s-wave light; and a projection unit enlarging and projecting the s-wave light to form a color image on a screen.

The light source includes a lamp and a parabolic reflector, and light emitted from the lamp is reflected by the parabolic reflector, so that parallel light directs toward the retardation film. An angle of an optical axis is 45°. The retardation film is a half-wave plate or a quarter wave plate. The retardation film covers a half of the front surface of the first polarizing beam splitter. The retardation film has a triangular cross-section or a rectangular cross section. The modulating unit is a reflective liquid crystal display (LCD).

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Figure 4:
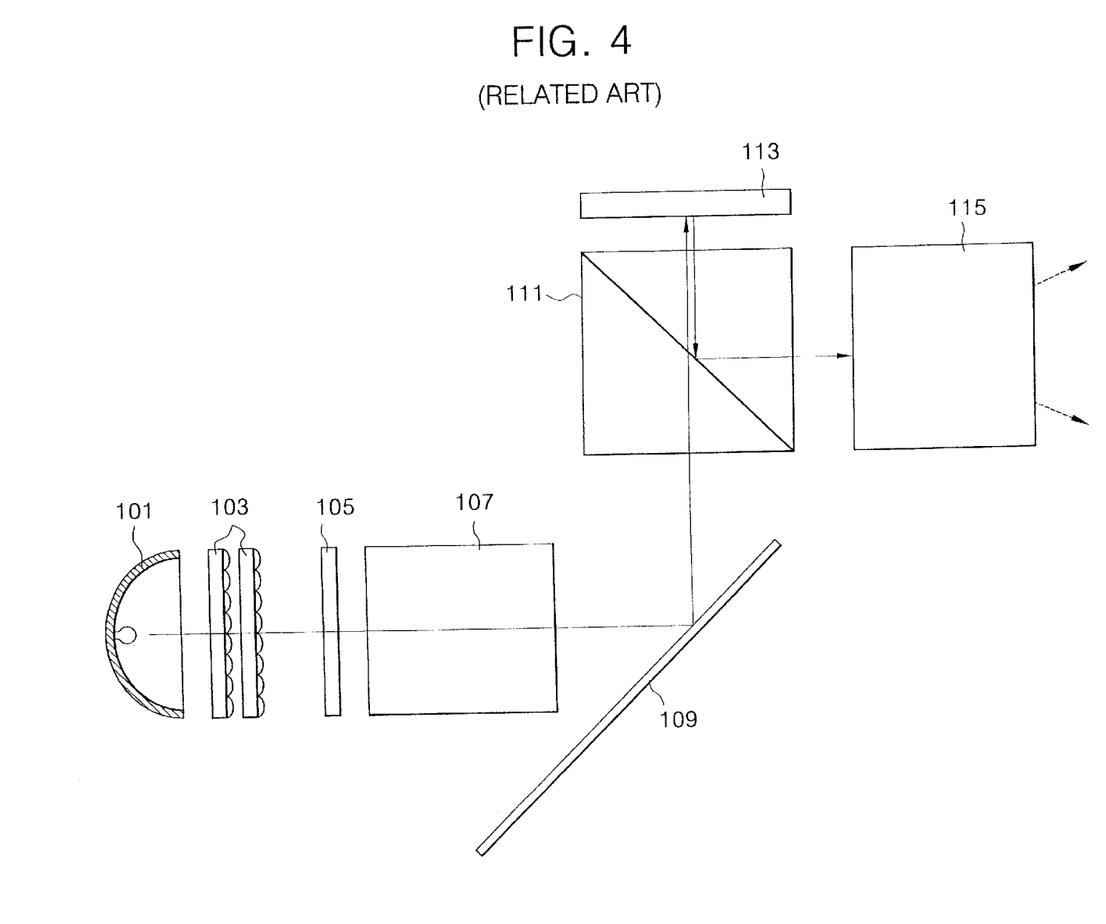
FIG. 4 is a schematic view illustrating a conventional LCOS projection display device.

Turning now to the drawings, FIG. 4 is a schematic view illustrating a conventional LCOS projection display device. The LCOS projection display device of FIG. 4 includes a light source 101, a fly-eyes lens 103, a polarization converting unit 105, a condensing lens 107, a color separating unit 109, a polarizing beam splitter 111, a reflective liquid crystal panel 113, and a projecting unit 115.

The fly-eyes lens 103 makes light emitted from the light source 101 uniform. The polarization converting unit 105 converts the uniformized light into a p-wave polarized light. The condensing lens 107 condenses the p-wave polarized light. The color separating unit 109 separates R, G and B light rays from the p-wave polarized light. The liquid crystal panel 113 generates s-wave polarized lights and p-wave polarized lights by a switching operation according to image signals. The polarizing beam splitter 111 reflects the s-wave polarized lights and transmits the p-wave polarized lights. The projecting unit 115 enlarges and projects the s-wave polarized lights to form a color image on a screen (not shown).

Figure 5:
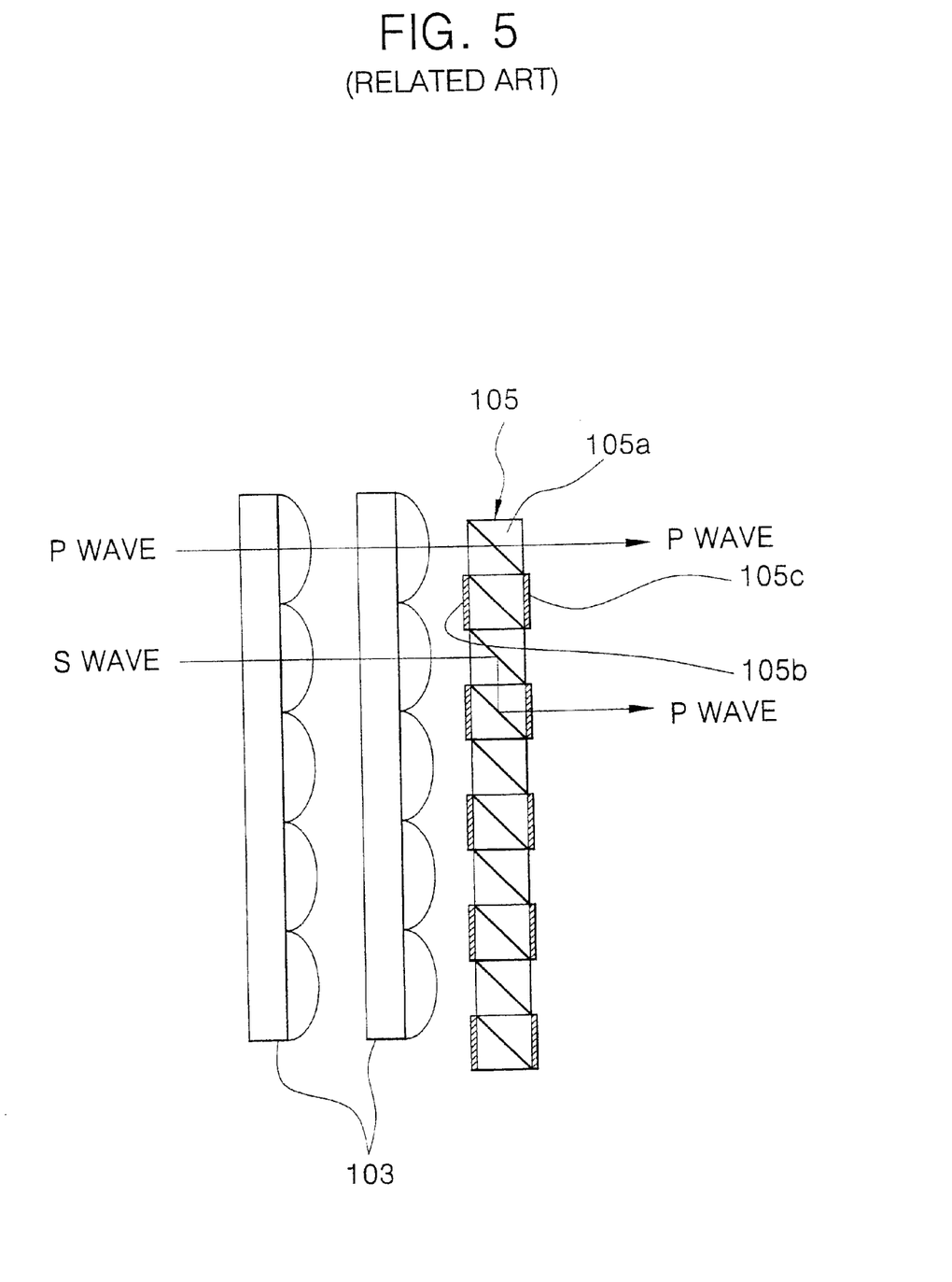
FIG. 5 is an enlarged view illustrating a fly-eyes lens and a polarization converting unit of the projection display device of FIG. 4.

FIG. 5 is an enlarged view illustrating the fly-eyes lens 103 and the polarization converting unit 105.

Referring to FIG. 5, the polarization converting unit 105 includes a plurality of prisms 105a which allow a p-wave light to be transmitted and reflect an s-wave light. Light shielding films 105b are disposed on front surfaces of the prisms 105a at prism-height intervals, and retardation films (i.e., half-wavelength plate) 105c are disposed on rear surface of the prisms 105a opposite to the light shielding films 105b to convert the s-wave light into the p-wave light. Here, an unpolarized light is converted into a polarized light while passing through the prism 105a.

The projection display device having such a configuration achieves a sufficient amount of light. However, in order to make light enter only a half of the polarization converting unit 105, a refraction of the fly-eyes lens 103 and a distance between two fly-eyes lenses 103 must be adjusted. This results in increasing an angle distribution of light by twice due to Lagrange invariant. In this case, there occurs a problem in that a large size of optical components is required, and a contrast ratio is lowered.

Figure 1:
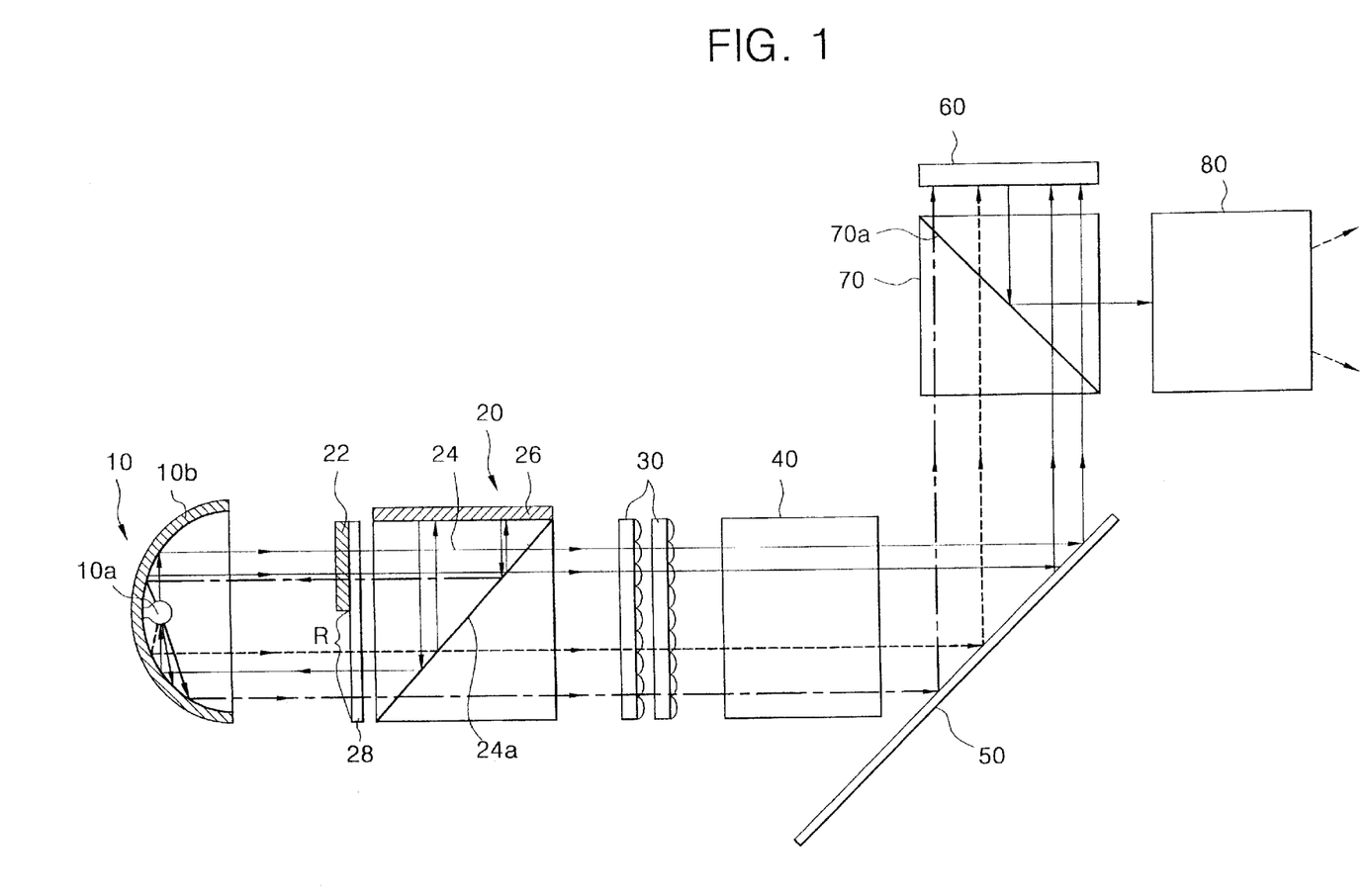
FIG. 1 is a schematic view illustrating a configuration of a projection display device according to a preferred embodiment of the present invention.

FIG. 1 is a schematic view illustrating a configuration of a projection display device according to the preferred embodiment of the present invention. The projection display device of FIG. 1 includes a light source 10, a light converting unit 20 with a first polarizing beam splitter 24, a fly-eyes lens 30, a condensing lens 40, a color separating unit 50, a modulating unit 60, a second polarizing beam splitter 70, and a projecting unit 80.

The light source 10 includes a lamp 10a and a parabolic reflector 10b. White light emitted from the lamp 10a is reflected by the parabolic reflector 10b, so that parallel light directs toward the light converting unit 20. The light converting unit 20 converts the white light emitted from the light source 10 into a p-wave polarized light. The fly-eyes lens 30 makes the p-wave polarized light passing through the light converting unit 20 uniform. The condensing lens 40 condenses uniformized light. The color separating unit 50 separates R, G and B lights from light passing through the 18 condensing lens 40 and directs R, G and B lights toward the modulating unit 60, respectively. For 19 example, a color wheel is used as the color separating unit 50. The modulating unit 60 modulates R, G and B lights so as to form a color image by a switching operation. Preferably, a reflective liquid crystal display (LCD) is used as the modulating unit 60. The second polarizing beam splitter 70 is configured to transmit only a certain element of light (i.e., p-wave polarized light) and thus reflects only an element of modulated light (i.e., s-wave polarized light) required to form a color image. The projecting unit 80 enlarges and projects a color image of light reflected from the second polarizing beam splitter 70, thereby forming a color image on a screen (not shown).

Figure 2:
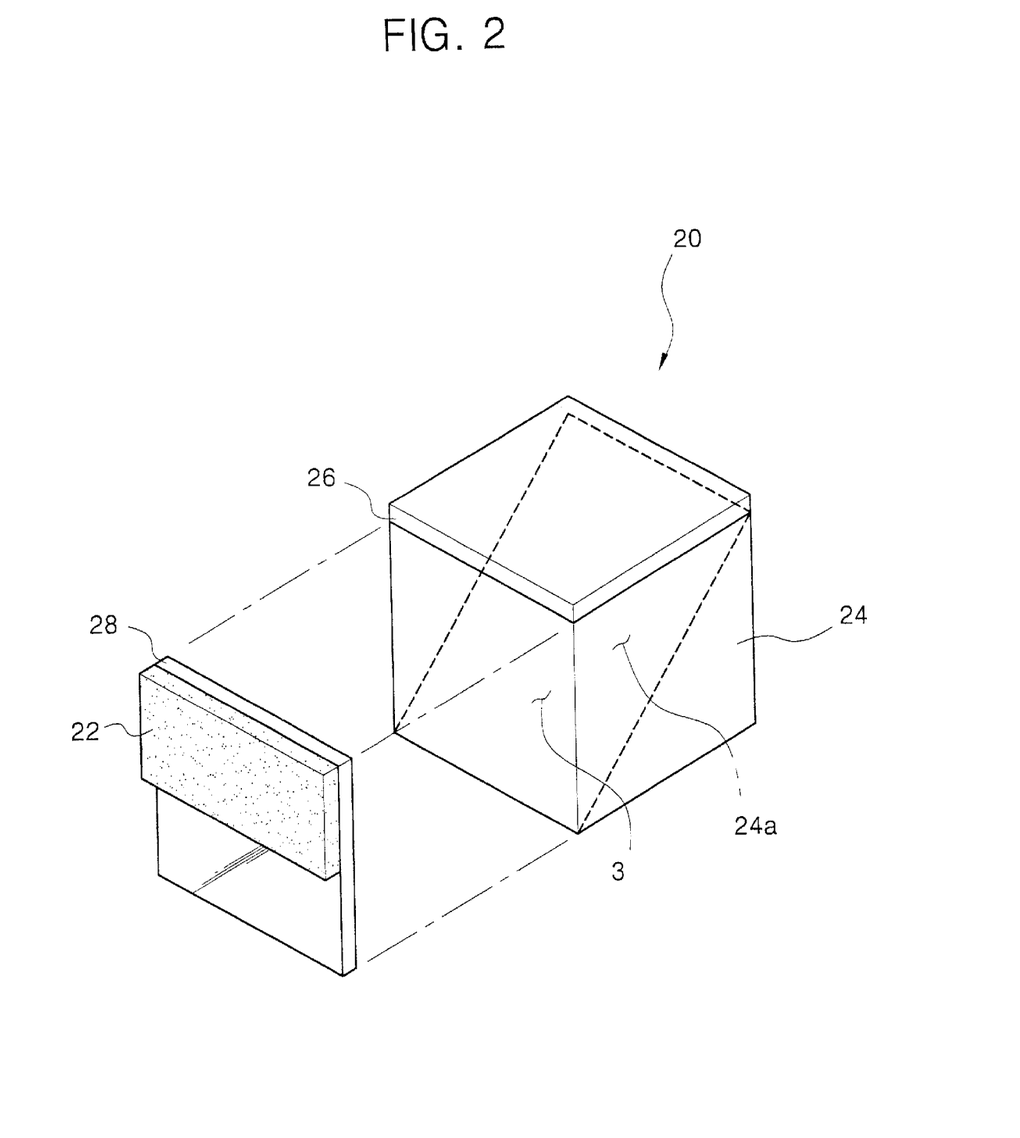
FIG. 2 is a perspective view illustrating a light converting unit of the projection display device of FIG. 1.

FIG. 2 is a perspective view illustrating the light converting unit 20. The light converting unit 20 includes a retardation film 22, a first polarizing beam splitter 24, and a mirror 26. The retardation film 22 is disposed on a glass plate 28 in front of the first polarizing beam splitter 24 and converts an s-wave light into a p-wave light and a p-wave light into an s-wave light. The first polarizing beam splitter 24 converts an unpolarized light into a polarized light, and transmits the p-wave polarized light "as is" (without change) and reflects the s-wave polarized light. The first polarizing beam splitter 24 includes a reflecting surface 24a which reflects the s-wave polarized light in a perpendicular direction to light incident thereto. The mirror 26 is disposed on a top surface of the first polarizing beam splitter 24 and re-reflects the s-wave polarized light reflected from the reflecting surface 24a.

Figure 3A:
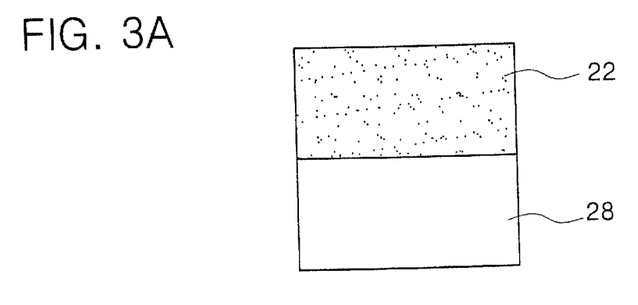
FIGS. 3A to 3D shows various shapes of retardation film according to the preferred embodiment of the present invention.
Figure 3B:
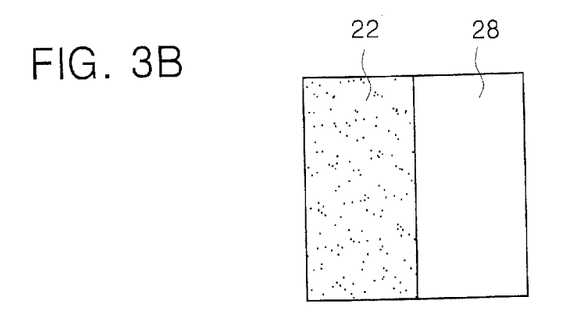
Figure 3C:
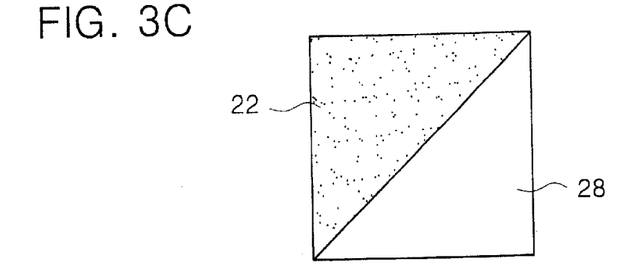
Figure 3D:
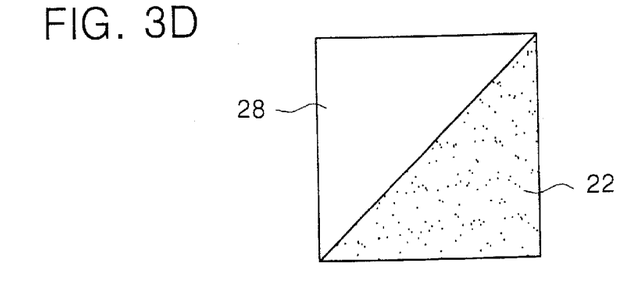

The retardation film 22 can have various shapes as shown in FIGS. 3A to 3D. The retardation film 22 may include a rectangular cross-section as seen FIGS. 3A and 3B or a triangular cross section as seen in FIGS. 3C and 3D. A λ/2 plate (half-wave plate) or a λ/4 plate (quarter-wave plate) is used as the retardation film 22. Preferably, the half-wave plate is used as the retardation film 22. In both the half-wave plate and the quarter-wave plate, it is preferred that an angle of an optical axis is 45°. Also, the retardation film 22 is preferably configured to cover a half of a front surface of the first polarizing beam splitter 24. When an angle of the optical axis is 45° and the retardation film 22 covers a half of a front surface of the first polarizing beam splitter 24, an improvement effect of a light efficiency becomes maximum.

Operation of the projection display device according to the present invention is described below.

White light emitted from the light source 10 includes an s-wave light and a p-wave light. The white light arrives at the first polarizing beam splitter 24 "as is" (without change). That is, while passing through the retardation film 22, the s-wave light is converted into the p-wave light, and the p-wave light is converted into the s-wave light. Here, the p-wave and the s-wave lights are converted into the p-wave and the s-wave polarized light by the first polarizing beam splitter 24, respectively. The p-wave polarized light transmits through the first polarizing beam splitter 24, whereas the s-wave polarized light is reflected from the reflecting surface 24a and directs toward the mirror 26. The s-wave polarized light is reflected from the mirror 26 and the reflecting surface 24a again and directs through the glass plate 28. The s-wave polarized light passing through the retardation film 22 is converted into the p-wave polarized light. The p-wave polarized light is reflected from the parabolic is reflector 10b of the light source 10 and then passes through a portion R of the glass plate 28 which is not covered with the retardation film 22. The p-wave polarized light transmits through the first beam splitter 24 "as is" (without change). The s-wave polarized light passing through the portion R of the glass plate 28 is reflected from the parabolic reflector 10 of the light source 10 and then directs toward the retardation film 22. The s-wave polarized light passing through the retardation film 22 is converted into the p-wave polarized light. Here, the process described above is performed repeatedly until all element of the light emitted from the light source 10 is converted into the p-wave polarized light and arrives at the first polarizing beam splitter 24. Accordingly, a large amount of light can be secured, leading to a high optical efficiency.

The p-wave polarized light passing through the light converting unit 20 is uniformized by the fly-eyes lens 30 and then is condensed by the condensing lens 40.

The p-wave polarized light passing through the condensing lens 40 is separated into R, G and B lights by the color separating unit 50. The R, G and B lights are directed toward the reflective LCD 60. Since the R, G and B lights are the p-wave polarized lights and so they transmit through the second polarizing beam splitter 70 "as is" (without change). The reflective LCD 60 modulates the R, G and B lights by a switching operation according to image signals to output the p-wave polarized light and the s-wave polarized light. The second polarizing beam splitter 70 reflects only the s-wave polarized lights from the reflecting surface 70a, and the projecting unit 80 enlarges and projects the s-wave polarized light, thereby forming a color image on a screen (not shown).

Figure 6:
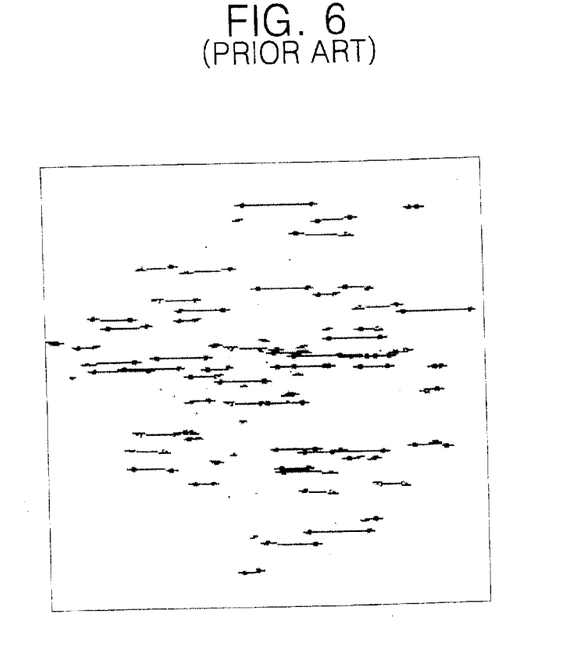
FIG. 6 is a simulation result illustrating a polarization characteristic of the conventional projection display device.
Figure 7:
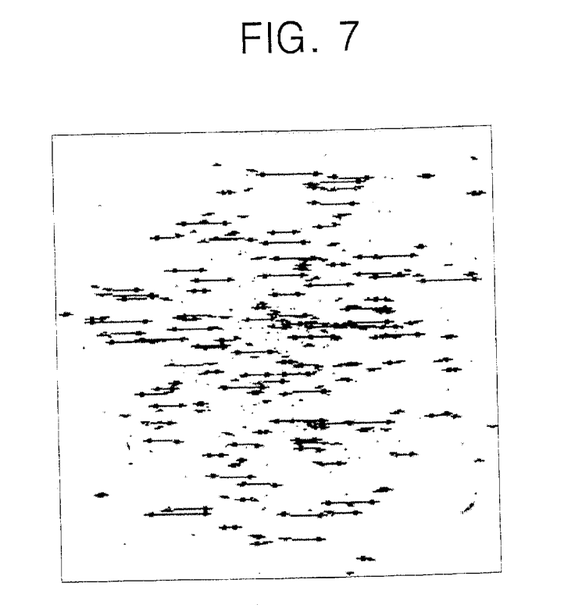
FIG. 7 is a simulation result illustrating a polarization characteristic of the projection display device according to the present invention.

FIG. 6 is a simulation result illustrating a polarization characteristic of a prior art projection display device (U.S. Pat. No. 5,446,510), and FIG. 7 is a simulation result illustrating a polarization characteristic of the projection display device according to the present invention. In FIGS. 6 and 7, a double arrow line denotes a polarization direction.

As can be seen in FIGS. 6 and 7, the projection display device of the present invention shows an excellent optical efficiency. Meanwhile the projection display device is equal in polarization ratio to the prior art.

Meanwhile, the light converting unit 20 can be designed to convert the white light emitted from the light source 10 into an s-wave light. In this case, the polarizing beam splitters 24 and 70 are designed to transmit the s-wave lights and reflect the p-wave lights.

As described herein before, the projection display device achieves an excellent optical efficiency, a high brightness, and a high light uniformity.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A projection display apparatus, comprising:
   a light source supplying light including an s-wave light and a p-wave light;
   a first polarizing beam splitter including a reflecting surface, transmitting one of the p-wave and s-wave lights and reflecting the other;
   a retardation film arranged between said light source and said first polarizing beam splitter to cover a portion of a front surface of said first polarizing beam splitter, and converting the s-wave light into the p-wave light and the p-wave light into the s-wave light; and
   a mirror re-reflecting the light reflected from said reflecting surface of said first polarizing beam splitter toward said reflecting surface of said first polarizing beam splitter, accommodating the light reflected from said reflecting surface being directed toward said retardation film.

2. The apparatus of claim 1, further comprised of said light source including a lamp and a parabolic reflector, and light emitted from said lamp being reflected by said parabolic reflector, accommodating parallel light being directed toward said retardation film.

3. The apparatus of claim 1, further comprised of said retardation film including an angle of an optical axis being 45°.

4. The apparatus of claim 3, further comprised of said retardation film being any one of a half-wave plate and a quarter wave plate.

5. The apparatus of claim 1, further comprising,
   a fly-eyes lens making the light passing through said first beam splitter uniform;
   a condensing lens condensing the light passing through said fly-eyes lens;
   a color separating unit separating red, green and blue lights from the light passing through said condensing lens;
   a modulating unit modulating the red, green and blue lights incident on said modulating unit from said color separating unit, in order to output a p-wave light and s-wave light;
   a second polarizing beam splitter transmitting one of the p-wave and the s-wave lights and reflecting the other from said modulating unit; and
   a projection unit enlarging and projecting the light reflected from said second polarizing beam splitter to form a color image on a screen.

6. The apparatus of claim 5, further comprised of said modulating unit being a reflective liquid crystal display.

7. The apparatus of claim 5, further comprised of said light source including a lamp and a parabolic reflector, and light emitted from said lamp being reflected by said parabolic reflector, so that parallel light directs toward said retardation film.

8. The apparatus of claim 5, further comprising an angle of an optical axis being 45°.

9. The apparatus of claim 8, further comprised of said retardation film being any one of a half-wave plate and a quarter wave plate.

10. The apparatus of claim 5, further comprised of said retardation film having any one of a triangular cross-section and a rectangular cross section.

11. A projection display apparatus, comprising:
    a light source supplying light including an s-wave light and a p-wave light;

a first polarizing beam splitter including a reflecting surface, transmitting one of the p-wave and s-wave lights and reflecting the other;

a retardation film arranged between said light source and said first polarizing beam splitter to cover a portion of a front surface of said first polarizing beam splitter, and converting the s-wave light into the p-wave light and the p-wave light into the s-wave light; and a mirror re-reflecting the light reflected from said reflecting surface of said first polarizing beam splitter toward said reflecting surface of said first polarizing beam splitter, accommodating the light reflected from said reflecting surface being directed toward said retardation film, said retardation film covering a half of said front surface of said first polarizing beam splitter.

12. The apparatus of claim 11, further comprised of said retardation film having any one of a triangular cross-section and a rectangular cross section.

13. A projection display apparatus, comprising:

a light source supplying light including an s-wave light and a p-wave light;

a first polarizing beam splitter including a reflecting surface, transmitting one of the p-wave and s-wave lights and reflecting the other;

a retardation film arranged between said light source and said first polarizing beam splitter to cover a portion of a front surface of said first polarizing beam splitter, and converting the s-wave light into the p-wave light and the p-wave light into the s-wave light;

a mirror re-reflecting the light reflected from said reflecting surface of said first polarizing beam splitter toward said reflecting surface of said first polarizing beam splitter, accommodating the light reflected from said reflecting surface being directed toward said retardation film;

a fly-eyes lens making the light passing through said first beam splitter uniform;

a condensing lens condensing the light passing through said fly-eyes lens;

a color separating unit separating red, green and blue lights from the light passing through said condensing lens;

a modulating unit modulating the red, green and blue lights incident on said modulating unit from said color separating unit, in order to output a p-wave light and an s-wave light;

a second polarizing beam splitter transmitting one of the p-wave and the s-wave lights and reflecting the other from said modulating unit; and a projection unit enlarging and projecting the light reflected from said second polarizing beam splitter to form a color image on a screen, said retardation film covering about half of said front surface of said first polarizing beam splitter.

14. An apparatus, comprising:

a first polarizing beam splitter including a reflecting surface, transmitting one of a p-wave and a s-wave lights and reflecting the other;

a retardation film covering a portion of a surface of said first polarizing beam splitter, and converting the s-wave light into the p-wave light and the p-wave light into the s-wave light; and a mirror re-reflecting the light reflected from said reflecting surface of said first polarizing beam splitter toward said reflecting surface of said first polarizing beam splitter, accommodating the light reflected from said reflecting surface being directed toward said retardation film, the light being used to form a color image.

15. The apparatus of claim 14, further comprised of said retardation film including an angle of an optical axis being approximately 45°.

16. The apparatus of claim 15, further comprised of said retardation film being any one of a half-wave plate and a quarter wave plate.

17. An apparatus, comprising:

a first polarizing beam splitter including a reflecting surface, transmitting one of a p-wave and a s-wave lights and reflecting the other;

a retardation film covering a portion of a surface of said first polarizing beam splitter, and converting the s-wave light into the p-wave light and the p-wave light into the s-wave light; and a mirror re-reflecting the light reflected from said reflecting surface of said first polarizing beam splitter toward said reflecting surface of said first polarizing beam splitter, accommodating the light reflected from said reflecting surface being directed toward said retardation film, the light being used to form a color image, said retardation film including an angle of an optical axis being approximately 45°, said retardation film being any one of a half-wave plate and a quarter wave plate, said retardation film covering approximately half of said surface of said first polarizing beam splitter.

18. The apparatus of claim 17, further comprised of said retardation film having any one of a triangular cross-section and a rectangular cross section.

19. The apparatus of claim 18, further comprised of a parallel light including the p-wave light and the s-wave light, the parallel light being directed toward said retardation film.

20. A projection display apparatus, comprising:

a light source supplying light including an s-wave light and a p-wave light, said light source including a lamp and a parabolic reflector;

a first polarizing beam splitter including a reflecting surface, transmitting one of the p-wave and s-wave lights and reflecting the other;

a retardation film arranged between said light source and said first polarizing beam splitter to cover a portion of a front surface of said first polarizing beam splitter, and converting the s-wave light into the p-wave light and the p-wave light into the s-wave light, light emitted from said lamp being reflected by said parabolic reflector accommodating parallel light being directed toward said retardation film, said retardation film including an angle of an optical axis being 45°, said retardation film being any one of a half-wave plate and a quarter wave plate, said retardation film covering a half of said front surface of said first polarizing beam splitter, said retardation film being any one of a triangular cross-section and a rectangular cross section;

a mirror re-reflecting the light reflected from said reflecting surface of said first polarizing beam splitter toward said reflecting surface of said first polarizing beam splitter, accommodating the light reflected from said reflecting surface being directed toward said retardation film;

a fly-eyes lens making the light passing through said first beam splitter uniform;

a condensing lens condensing the light passing through said fly-eyes lens;

a color separating unit separating red, green and blue lights from the light passing through said condensing lens;

a reflective liquid crystal display modulating the red, green and blue lights incident on said reflective liquid crystal display from said color separating unit in order to output a p-wave light and an s-wave light;

a second polarizing beam splitter transmitting one of the p-wave and the s-wave lights and reflecting the other from said reflective liquid crystal display; and a projection unit enlarging and projecting the light reflected from said second polarizing beam splitter to form a color image on a screen.

* * * * *